United States Patent [19]

Pedersen

[11] Patent Number: 4,924,913
[45] Date of Patent: May 15, 1990

[54] TUBE COUPLING SYSTEM

[75] Inventor: Niels H. Pedersen, High Point, N.C.

[73] Assignee: Nord Tech, Inc., Thomasville, N.C.

[21] Appl. No.: 150,959

[22] Filed: Feb. 1, 1988

[51] Int. Cl.$^5$ ............................................. F16L 19/02
[52] U.S. Cl. ................................... 138/155; 285/411; 285/420
[58] Field of Search ................ 138/155, 120; 285/373, 285/406, 407, 409, 411, 412, 420, 365, 368, 367

[56] References Cited

U.S. PATENT DOCUMENTS

| | | | |
|---|---|---|---|
| 1,007,326 | 10/1911 | Boyd | 285/420 |
| 1,644,553 | 10/1927 | Trout | 285/407 |
| 3,042,430 | 7/1962 | Guy | 285/420 |
| 3,228,714 | 1/1966 | Dricken | 285/420 |
| 3,744,825 | 7/1973 | Cooper et al. | 285/407 |
| 3,964,773 | 6/1976 | Stade et al. | 285/411 |
| 4,008,937 | 2/1977 | Filippi | 285/409 |
| 4,640,536 | 2/1987 | Printiss et al. | 285/420 |

FOREIGN PATENT DOCUMENTS

| | | | |
|---|---|---|---|
| 541980 | 1/1932 | Fed. Rep. of Germany | 285/407 |
| 671376 | 10/1964 | Italy | 285/409 |
| 735271 | 8/1955 | United Kingdom | 285/409 |
| 1050871 | 12/1966 | United Kingdom | 285/409 |

Primary Examiner—James E. Bryant, III

[57] ABSTRACT

A tube coupling system for joining a plurality of metal tubes that are used in air flow systems which includes at least two tubular members each having at least one curled end. A clamping member is used to join the tubular members in an abutting interfacing engagement, the clamping member having a one-piece split coupler with two free ends which removably and circumferentially surround the joined tubular members along their curled ends. The coupler also has a spring locking member which is connected to the coupler free ends and moveable to connect and release the free ends and latch and unlatch the coupler from the members. A split pin can be used to secure the spring locking member. The clamping member coupler has a body portion and leg members affixed to and depending from the body portion so that the body portion and depending leg members are configured to envelope and grip substantially all of the curled ends of two connected tubular members. The connection between the tubular members is enhanced by the use of a sealing device positioned along the curled ends. Non-standard length tubular members can be provided with a connecting end by the use of an O ring when a curled end is not present.

13 Claims, 3 Drawing Sheets

TUBE COUPLING SYSTEM

BACKGROUND OF THE INVENTION

Tube coupling systems are used in a variety of air moving devices to clamp the connecting ends of metal tubes. Efforts to control pollution and improve the environment have resulted in the development of extensive air movement systems such as air filtration systems, air suction systems, pneumatic transport systems, and a variety of solid fuel burning systems. The clamping mechanisms used to join connecting tubular members should be relatively inexpensive and sufficiently strong to enable the connected tubular members to withstand system forces involved.

Tubular clamping devices, to be fully effective, must provide a full 360° closure in order to achieve a positive gas tight seal. Moreover, the clamping devices should be reusable so they need not be discarded when removed. Such devices can be for a specific tube diameter or can be adjusted and sized to fit a variety of tube diameters.

SUMMARY OF THE INVENTION

The present invention is directed to a improved tube coupling system for connecting abutting ends of tubular members in a gas-tight configuration.

Tubular members used in air movement systems are usually of a predetermined length except when special dimensioned or non-standard lengths are required. In the present invention, the tubular members are normally provided with rolled or curled ends produced by a machine appropriately designed to achieve that result. The curled ends are positioned end to end and joined by a clamping member forming a part of the inventive system.

The clamping member includes, in preferred form, a one-piece split coupler having two free ends which enable it to be circumferentially positioned around the abutting curled ends of two tubular members. The free ends of the coupler are joined by a spring locking member connected thereto which can be leveraged to draw the coupler tightly around the abutting ends and thereby produce a gas-tight seal. The seal of the two joined ends may be enhanced by the use of an appropriately configured gasket or other suitable component positioned therebetween.

The clamping member coupler is substantially U-shaped in cross section having a body portion and two leg portions depending therefrom. The U-shaped configuration enables the coupler to envelope and grip substantially all of the exterior of the curled ends of the joined members thus providing a secure and substantial joint that will resist separation and gas leakage under a variety of pressures.

The clamping member of the present invention is relatively inexpensive, yet is capable of providing a substantial clamping action to hold two abutting tubular members together. It also provides a full 360° closure to ensure a positive gas-tight seal and thereby prevent separation and leakage at the joint between joined tubular members.

The clamping member of the present invention is reusable. It is capable of maintaining a positive clamping action when subjected to extreme conditions of heat, stress, shock or engine vibration.

Other objects and advantages of the present inventive concept will become more apparent after a consideration of the following detailed description taken in conjunction with the accompanying drawings wherein like characters of reference designate like parts throughout the several views.

DESCRIPTION OF THE DRAWINGS

The drawings illustrate the best mode presently contemplated of carrying out the invention. In the drawings.

DETAILED DESCRIPTION OF THE INVENTION

Figure 1:
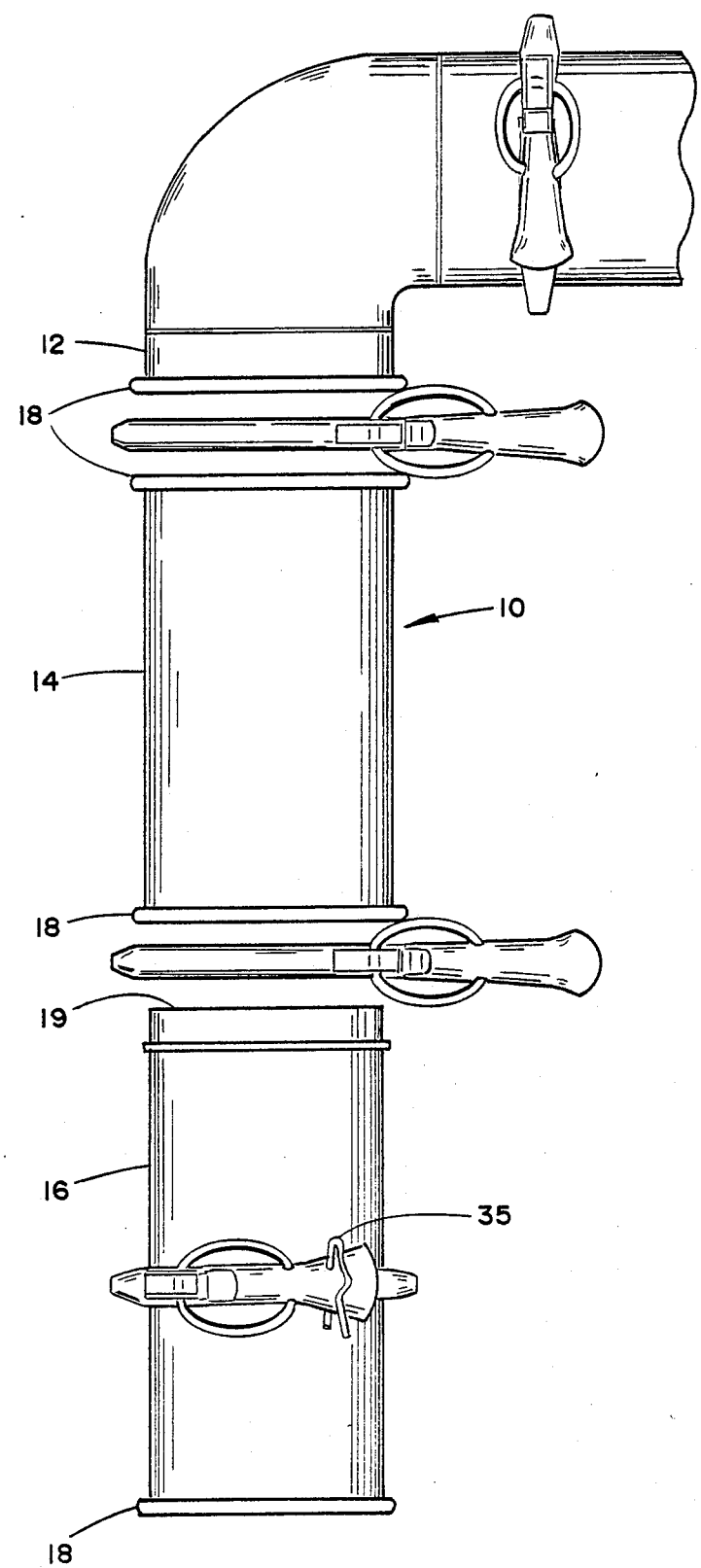
FIG. 1 is a side elevational, exploded and fragmentary view of the tube coupling system comprising the present invention showing a plurality of tubular members, some of which are provided with curled ends, and a clamping member to be utilized for joining abutting ends of the tubular members.
Figure 2:
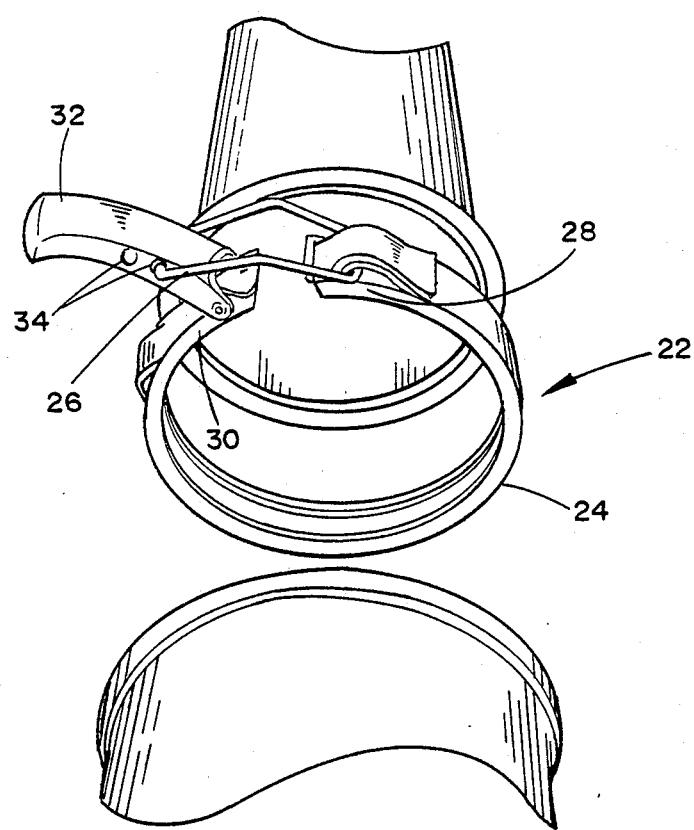
FIG. 2 is a perspective and fragmentary view of clamping members and two curled ends of tubular members to be joined and connected.

Referring now to the drawings and particularly to FIG. 1, the tube coupling system comprising the present invention shown generally as 10 includes a plurality of tubular members 12, 14, 16, 17 some of which have curled ends 18 which are uniformly configured by an appropriately designed machine (not shown). A curled 18 end is formed by rolling the terminal edge 19 of a tubular member outwardly and around so that a substantially circular cross-section is achieved uniformly around the circumference of the tubular member terminal edge.

Figure 3:
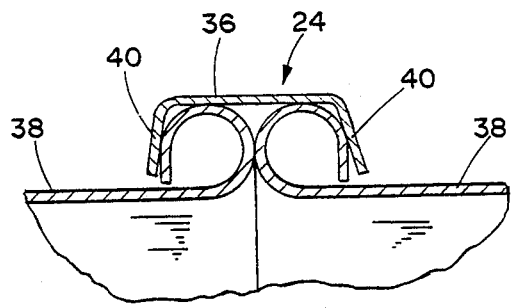
FIG. 3 is a sectional, fragmentary and enlarged view of the clamping member holding the curled ends of two tubular members in an abutting relationship.

To provide the desired tubular configuration for an air flow system, a number of the tubular members are joined together in an end to end abutting relationship like that shown cross-sectionally in FIG. 3. A coupler shown generally as 22 includes a one-piece split clamping member generally shown as 24 removably and circumferentially surrounding the curled ends of the tubular members thereby holding the members in a fixed configuration with respect to each other. A spring locking member 26 is connected directly to one end 28 of clamping member 24 and indirectly to the other end 30 via a locking lever 32 having apertures 34 to provide for variable locking pressure. Aperture 34 also serves as an opening to receive locking split pin 35 as shown in FIG. 1.

Clamping member 24 has a body portion 36 which is positioned substantially parallel to tubular member walls 38. Leg members 40 are integral with and depend from body portion 36 in the manner shown in FIG. 3. When clamping member 24 is positioned around ends 18, body portion 36 and depending legs 40 envelope and grip substantially all of the exterior of the curled ends 18 of the connected and contiguous tubular members.

Figure 4:
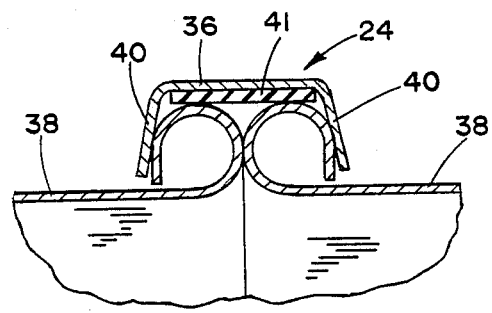
FIG. 4 is a sectional, fragmentary and enlarged view of the clamping member holding the curled ends of two tubular members in an abutting relationship with a gasket or sealing member positioned along the exterior edges of the curled ends.

While a satisfactory seal under most conditions is achieved by joining the curled ends of two tubular members as illustrated in FIG. 3, it is advantageous in certain situations to provide additional sealing means such as the gasket or sealing member 41 shown in FIG. 4. The thickness, width and material of the gasket can be varied, depending upon the requirements of the system being installed.

Figure 5:
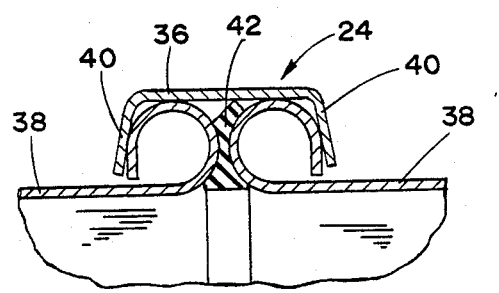
FIG. 5 is an enlarged fragmentary view of the clamping member holding two curled ends in an abutting relationship with a gasket positioned between the contacting surfaces of the curled ends to provide a positive seal.

An alternative gasket 42 may be employed as shown in FIG. 5. In such a construction, the gasket 42 is positioned between the two abutting curled ends of tubular members to further enhance the seal between such members when body portion 36 and depending legs 40 envelope and grip the curled ends in an abutting relationship.

Figure 6:
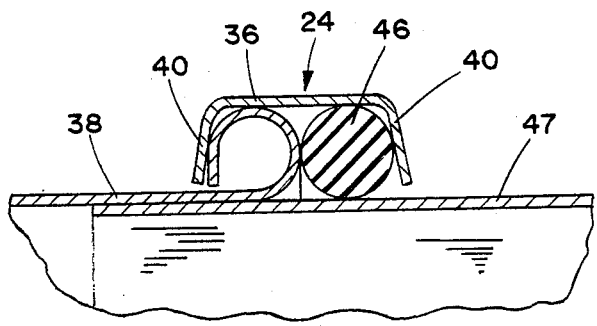
FIG. 6 is an enlarged, sectional fragmentary view of the clamping member holding a tubular member curled end a tubular member end with an O ring positioned thereabout in an abutting relationship.

In those situations where a non-standard length is required for a tubular member like that shown as 16 in FIG. 1, an O ring may be substituted for the curled end which has been omitted or removed from the tubular member in the manner shown in FIGS. 1 and 6. The O ring 46 is formed from a resilient rubber-like material, the preferred substance being neoprene. Obviously a variety of other materials are suitable for such application.

In utilizing a non-standard length member 16, it is necessary to use an adapter tube 14, the inside diameter of which is equal to or slightly larger than the outside diameter of the standard length tubular member. This adapter tube 14 can slide over the tubular section end 47 where one curled end has been removed as shown in FIG. 6. By positioning the O ring 46 over end 47 and locking clamping member 22, a non-standard length connection is now present.

While there has been described a coupling system and embodiments of a coupler forming a part thereof, it is to be understood that various other modifications can be made in this system and the coupler and are contemplated as being within the scope of the following claims particularly pointing out and distinctly claiming the subject matter which is regarded as the invention.

I claim:

1. A tube coupling system comprising: at least two substantially rigid tubular members each having at least one unsupported curled end forming an abutting edge, at least one curled end being formed by rolling an end of said tubular member outwardly to create a circumferential ring having a substantially circular interrupted cross-section; a coupler for joining said tubular members in an abutting curled end interfacing engagement; and means associated with said tubular members for providing a sealed connection between said curled ends, said coupler having a one-piece split clamping member having two free ends and removably and circumferentially surrounding said tubular members proximate said curled ends thereby limiting movement of said tubular members with respect to each other, a spring locking member connected to said clamping member free ends movable to join and release said free ends and latch and unlatch said clamping member from said tubular members, said clamping member having a flat body portion and straight leg members affixed to and depending from said flat body portion, said flat body portion and straight leg members configured to envelope and grip substantially all of said curled ends of said tubular members.

2. The system as claimed in claim 1 wherein said sealing means is a gasket positioned at the abutting interfacing engagement of said tubular member curled ends.

3. The system as claimed in claim 1 wherein at least one of said tubular member curled ends is formed by an unsecured and unenveloped O ring.

4. The system as claimed in claim 1 wherein said sealing means also includes a gasket positioned parallel to said clamping member flat body portion.

5. The system as claimed in claim 1 wherein said spring locking member includes a latching lever affixed to said clamping member and a spring affixed to said clamping member and said latching lever.

6. The system as claimed in claim 2 wherein at least one of said tubular member curled ends is formed by an unsecured and unenveloped O-ring.

7. The system as claimed in claim 2 wherein said spring locking member includes a latching lever affixed to said clamping member and a spring affixed to said clamping member and said latching lever.

8. The system as claimed in claim 6 wherein said spring locking member includes a latching lever affixed to said clamping member and a spring affixed to said clamping member and said latching lever.

9. The system as claimed in claim 1 further comprising means to lockably secure said spring locking member in locked position.

10. The system as claimed in claim 9 wherein said lockable securing means is a split pin.

11. The system as claimed in claim 3 wherein said tubular member O-ring formed curled end has a selectively variable length.

12. The system as claimed in claim 3 wherein the diameter of said tubular member proximate said O-ring is slightly smaller than the diameter of said abutting tubular member.

13. The system as claimed in claim 3 wherein said tubular member O-ring formed curled end has a selectively variable length and the diameter of said tubular member proximate said O-ring is slightly smaller than the diameter of said abutting tubular member.

* * * * *